F. A. THURSTON.
DRIVING AND REVERSING MECHANISM.
APPLICATION FILED APR. 10, 1908.
938,800. Patented Nov. 2, 1909.
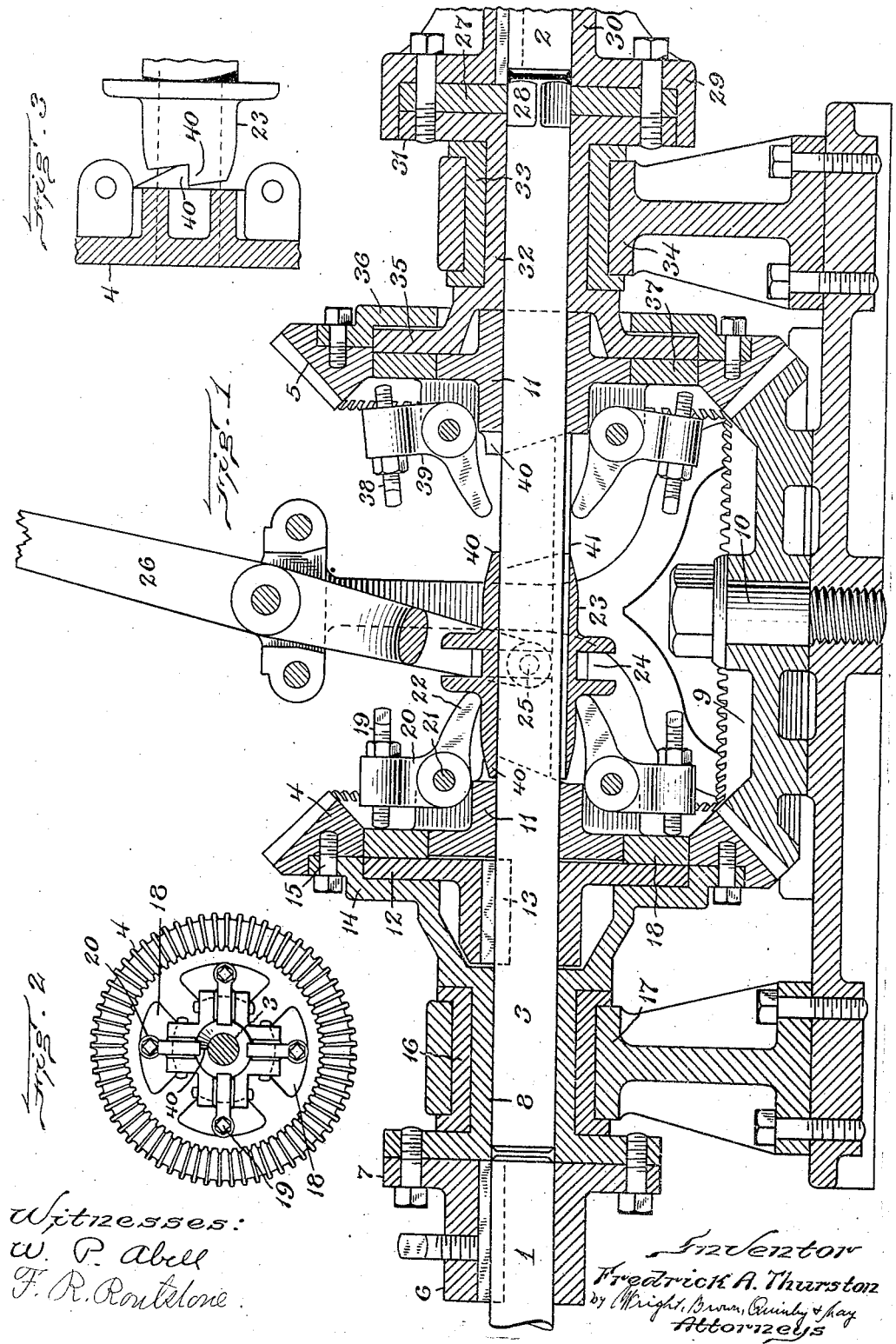
Witnesses:
W. P. Abell
F. R. Roulstone
Inventor
Fredrick A. Thurston
by Wright, Brown, Quinby & May
Attorneys

UNITED STATES PATENT OFFICE.

FREDRICK A. THURSTON, OF LYNN, MASSACHUSETTS, ASSIGNOR OF ONE-HALF TO ALEXANDER STEWART, JR., OF LYNN, MASSACHUSETTS.

DRIVING AND REVERSING MECHANISM.

938,800.

Specification of Letters Patent.  Patented Nov. 2, 1909.

Application filed April 10, 1908. Serial No. 426,229.

*To all whom it may concern:*

Be it known that I, FREDRICK A. THURSTON, of Lynn, in the county of Essex and State of Massachusetts, have invented certain new and useful Improvements in Driving and Reversing Mechanisms, of which the following is a specification.

This invention relates to a driving and clutching mechanism by which a driven member may be actuated alternately in opposite directions by a driving member continually operative in a single direction.

It has for its object to provide an improved mechanism of this character which will be sure in operation, of great strength, and capable of quick action.

The invention consists in the mechanism hereinafter described and claimed.

Of the accompanying drawings,—Figure 1 represents a longitudinal section of a mechanism embodying the essential features of my invention. Fig. 2 represents a cross-sectional view of a portion thereof, showing one of the driving and clutching devices. Fig. 3 represents a fragmentary elevation, showing an auxiliary positive clutch.

Referring to the drawings, it will be seen that the mechanism consists essentially of driving and driven shaft sections 1 and 2, respectively, an intermediate shaft section 3 which is also a driven section, and driving elements 4 and 5 which are operated by the driving shaft section and are alternately clutched to the other sections. These shaft sections are in alinement and are independent elements, although the driven and intermediate sections 2 and 3 are coupled together so that rotation is transmitted from one to the other, the form of coupling, however, permitting a slight endwise movement of the intermediate section for a purpose to be described.

The driving elements or members 4 and 5 are preferably gears, both of which are mounted on the intermediate shaft section 3 and turn loosely thereon. The gear 4 is coupled to the driving shaft section 1 by a coupling 6 keyed to the shaft and having a flange 7, and a sleeve 8 bolted to said flange 7 and to the gear 4. The other driving gear 5 receives its motion from the gear 4 through an intermediate gear 9 upon a stud 10 and meshing with both the gears 4 and 5. This driving connection causes the gears 4 and 5 to turn constantly in opposite directions. It is to be understood that I am not confined to such a connection, as any other form of drive may be employed which will cause the main driving members to rotate oppositely.

The gear 4 has a hub 11 which as before stated, turns loosely on the shaft section 3, and beside the same is a clutch member 12 which is firmly united to the shaft 3 by a key 13. This clutch member takes the form of a flange or disk perpendicular to the shaft and lying beside the web of the gear 4. The connection between this gear and the sleeve 8 previously described, takes the place of an annular flange, web or plate 14 formed upon the sleeve 8 and lying beside the disk 12 on the opposite side of the latter from the hub 11 of the gear. This plate or web is secured to the gear, as shown, by bolts 15. The sleeve 8 is rotatable in a bushing 16 in a bearing 17. and forms in turn a bearing for the shaft section 3 in which the latter is loosely rotatable.

The web of the gear between the hub and rim thereof is cored out or cut away in parts, as shown in Fig. 2, and in the spaces thus provided are inserted plates or pads 18 which lie close to the surface of the clutch disk 12 on the opposite side of the latter from the plate or disk 14. The pads 18 are held in place by adjustable stops 19 carried by bell-crank levers 20 pivoted to studs 21 on the hub of the gear. Each of these bell-cranks has an arm 22 extending beside the shaft and somewhat inclined toward the latter. There is a double conical actuator 23 which slides upon the shaft section and has a central annular groove 24 into which project studs 25 carried by the forked lower end of a manual actuating lever 26.

As will be readily understood, when the actuator 23 is moved toward the gear, its conical end inserts itself between the shaft and the ends of the bell-crank levers, forcing the latter outward and moving the adjustable stops 19 against the pads 18. Thus the pads are pressed firmly against the disk 12 and the reaction thereof being communicated to the body of the gear through the fulcrum pin 21, draws the plate 14 against the other side of the disk 12, or rather moves the disk against said plate, such movement being permitted by the latitude which is given to the shaft 3 to travel slightly endwise. Thereby the clutch disk 11 is gripped upon opposite sides by two flanking members which give the strongest possible frictional hold.

The above-described clutch mechanism serves to connect the intermediate shaft section and to cause it to rotate in one direction. This rotation is communicated to the driven section 2 through the medium of a disk 27 placed upon the end of the section 3. The end portion of this shaft section which receives the disk is of non-circular outline, being preferably square, as shown at 28, though any other form is suitable, and the disk has a correspondingly shaped hole through which such non-circular end projects. The disk is bolted to the flange 29 of a coupling 30 which is keyed to the section 2. It will be understood from this description, that rotation of the shaft section 3 without turning shaft section 2, is impossible, and that the manner of connecting the two sections together allows the intermediate section to travel endwise a short distance. Also coupled to the flange 29 is a disk or flange 31 on a sleeve 32 which loosely surrounds the shaft section 3, forming a bearing therefor, and is contained in a bushing 33 of a bearing 34. This sleeve carries a flange or disk 35 which lies beside the reverse driving gear 5 and between the web portion thereof and an annular plate 36 bolted to the back thereof. The gear 5 is constructed similarly to the gear 4 already described, and carries pads 37 which are pressed upon by adjustable stops 38 on bell-crank levers 39 whenever the lateral arms thereof are moved by the right-hand conical end of the actuator 23. Actuation of these bell-crank levers causes the disk 35 to be gripped between the plate 36 and pads 37 so as to be secured to the gear with a firm frictional hold. The coupling 30 transmits the reverse motion of the gear 5 when so clutched to the driven shaft section 2, the intermediate section being meanwhile released from the gear 4, and when the latter section and gear are clutched together, the driven section 2 is also rotated, but in the forward direction, by the engagement of the non-circular portion 28 and disk 27. Only one clutch is operative at the same time, for the reason that they can only be rendered operative by the actuator 23, and this member travels back and forth between them, being out of contact with one when operating upon the other. I have found that this construction provides great strength and a strong frictional hold, so that it is possible to throw first one and then the other clutch into engagement, causing the shaft section 2 to rotate in opposite directions as rapidly as an attendant can move the reversing lever 26 back and forth. With the greatest possible speed of shifting of the actuator, the clutching engagement is always firm, and at the same time there is no possibility of breaking any of the parts. The fact that the intermediate shaft section is movable endwise, allows the disk 12 to be forced tightly against the web plate 14 whenever the corresponding clutch is actuated, and also allows the disk to be relieved from this plate when the clutch is loosened. Thus an equal gripping pressure may be applied upon both faces of the disk without at the same time causing the disk always to press against the plate 14.

I have found it advantageous to supplement the action of the friction clutches by positive clutches. For this purpose the adjacent ends of the gear hubs 11 and the actuating sleeve 23 are provided with complemental clutch teeth 40, and the sleeve is connected to the intermediate shaft section by a feather 41 which causes it to rotate positively therewith while being free to slide thereon. By reason of the location of the positive clutch teeth above described, they are not caused to engage until after the friction clutch members have been brought together with their greatest degree of firmness, but when this engagement with the friction clutch members has been effected, the positive teeth come into action and effectually prevent any slipping of the driver with respect to the driven member. The friction clutch in becoming engaged, allows sufficient latitude for slipping to avoid shock in starting the driven member, and also danger of breakage, while the positive clutch guards against slipping after the driven member has been started.

I claim:—

1. A reversible driving mechanism, comprising a driving shaft section, two independently connectible driven shaft sections, one of which is movable endwise with respect to the other and connected so as to transmit rotation thereto, oppositely moving drivers actuated by said driving shaft section, an intermediate motion-transmitting connection between said drivers, clutch elements fixed to the respective driven sections, and clutches operable to secure said drivers one at a time to the said clutch elements.

2. A reversible driving mechanism, comprising a driven shaft section, two oppositely moving drivers rotatable loosely around said shaft section, a connection for transmitting reversed motion from one driver to the other, a second driven shaft section with which said first-named section is so engaged as to transmit rotation thereto, a clutch element secured to each of the said sections, and clutches carried by said drivers independently securable to said clutch elements, the first section having provision for some endwise movement, whereby either clutch element may be freed before the other is engaged.

3. A reversible driving mechanism, comprising two drivers, means for causing one of said drivers to rotate oppositely to the other, a single shaft section passing through both drivers, and coöperating clutching devices on the drivers and shaft respectively, one of said devices being fixed to said shaft, a second shaft section to which another of said devices is rigidly connected, said first shaft section being movable endwise to enable one of the clutches to be disconnected before the other is connected.

4. A reversible driving mechanism, consisting of a plurality of shaft sections, rotary drivers loose on one of said sections, a clutch element fixed to each section, complemental clutch elements carried by said drivers on opposite sides of each of the shaft clutch elements, means for rotating one of said drivers, means for causing the other driver to rotate oppositely thereto, and means for causing the driver clutch elements to grip the shaft clutch element between them.

5. A reversible driving mechanism, consisting of a plurality of shaft sections, rotary drivers loose on one of said sections, means for causing one of said drivers to rotate oppositely to the other, a disk secured to each said shaft section, a web detachably fastened to each said driver on one side of one disk, a movable plate or pad carrier by each driver on the opposite side of the disk, and a lever carried by the driver so as to bear against said pad and, when operated, to press the pad and web against the opposite side of the disk with a gripping action.

6. A reversible driving mechanism, consisting of a plurality of shaft sections, rotary drivers loosely mounted on one of said sections, means for causing one of said drivers to rotate oppositely to the other, a disk secured to each said shaft section, a web detachably fastened to each said driver on one side of a disk, a movable plate or pad carried by each driver on the opposite side of the disk, and a lever pivoted to the hub of each driver and adapted to press with one arm against said pad, whereby to force the pad and web against opposite sides of the disk and grip the latter between them.

7. A reversible driving mechanism, consisting of a plurality of shaft sections, rotary drivers loosely mounted on one of said sections, means for causing one of said drivers to rotate oppositely to the other, a disk secured to each said shaft section, a web detachably fastened to each said driver on one side of a disk, a movable plate or pad carried by each driver on the opposite side of the disk, a lever pivoted to the hub of each driver, having one arm extending beside the shaft and the other beside the pad, and a conical actuator movable endwise on the shaft, operable to force the adjacent lever arm of either driver away from the shaft and thereby press the other arm against the pad and the latter against the disk, the reaction of said pad and lever causing said web to bear against the disk, whereby the same is gripped simultaneously from opposite sides.

8. A reversible driving mechanism, consisting of a plurality of shaft sections, rotary drivers loosely mounted, means for causing one of said drivers to rotate oppositely to the other, a disk secured to each said shaft section, a web detachably fastened to each said driver on one side of a disk, a movable plate or pad carried by each driver on the opposite side of the disk, a lever pivoted to the hub of each driver, an actuator engaged with said shaft so as to be slidable thereon and rotatable therewith, arranged to move the lever of each driver in such manner as to press said pad and web grippingly against opposite sides of the disk, and complemental positive clutch elements on the adjacent portions of said actuator and drivers, whereby the latter are positively clutched to the shaft after the frictional clutching members have been brought into engagement.

9. A reversible driving mechanism consisting of a plurality of shaft sections, a disk secured to each section, a driving gear wheel beside each disk and loosely mounted with respect to said sections, a connection intermediate said gear wheels for transmitting reversed motion from one to the other, movable pads set into each gear to engage one face of a disk, a web or plate detachably secured to each gear so as to embrace the disk, and bell-crank levers pivoted to the hub of each gear, each having an arm adjacent one of the pads, said levers of either gear being simultaneously actuable to press the pads against one face of the disk and draw the web or plate against the other face thereof, whereby the disk is frictionally gripped to the gear.

10. A driving and reversing mechanism, comprising driving and driven shaft sections and an intermediate driven shaft section, a gear loose on said intermediate section and coupled to said driving section, a second gear also loose on the intermediate section, an intermediate driving connection through which said second gear is driven by the first said gear in the opposite direction, clutches carried by each of said gears, a member fixed to the intermediate shaft section adapted to be gripped by the clutch of the first gear, a similar member surrounding the intermediate section and coupled to the said driven section, adapted to be gripped by the clutch of the second gear, a connection whereby rotation is communicated to the driven section from the intermediate shaft section, and a clutch actuator arranged to cause either clutch singly to grip its respective member.

11. A driving and reversing mechanism comprising driving and driven shaft section and an intermediate driven shaft section, a gear loose on said intermediate section and coupled to said driving section, a second gear also loose on the intermediate section, an intermediate driving connection through which said second gear is driven by the first said gear in the opposite direction, clutches carried by each of said gears, a flange fixed to the intermediate shaft section adapted to be gripped by the clutch of the first gear, a sleeve surrounding the intermediate section and coupled to the said driven section, having a lateral flange adapted to be gripped by the clutch of the second gear, a connection whereby rotation is communicated to the driven from the intermediate shaft section, and a clutch actuator arranged to cause either clutch singly to grip its respective flange.

12. A driving and reversing mechanism, comprising driving and driven shaft sections and an intermediate driven shaft section, a gear lose on said intermediate section and coupled to said driving section, a second gear also loose on the intermediate section, an intermediate connection through which said second gear is driven by the first said gear in the opposite direction, clutches carried by each of said gears, a member fixed to the intermediate shaft section adapted to be gripped by the clutch of the first gear, a similar member surrounding the intermediate section and coupled to the said driven section, adapted to be gripped by the clutch of the second gear, and a coupling between the intermediate and driven shaft sections transmitting rotation from one to the other and permitting endwise movement of the former relatively to the latter.

13. A driving and reversing mechanism, comprising driving and driven shaft sections and an intermediate driven shaft section, a gear loose on said intermediate section and coupled to said driving section, a second gear also loose on the intermediate section, an intermediate pinion meshing with both gears through which said second gear is driven by the first said gear in opposite direction, clutches carried by each of said gears, a member fixed to the intermediate shaft section adapted to be gripped by the clutch of the first gear, a similar member surrounding the intermediate section and coupled to the said driven section, adapted to be gripped by the clutch of the second gear, and a disk surrounding the end of the intermediate shaft section and secured to the adjacent end of the driven section, said intermediate section being non-circular at its end and entering a correspondingly shaped aperture in said disk, whereby endwise motion thereof is permitted and rotation is transmitted therefrom to the driven section.

In testimony whereof I have affixed my signature, in presence of two witnesses.

FREDRICK A. THURSTON.

Witnesses:
P. W. PEZZETTI,
ARTHUR H. BROWN.